Patented Apr. 24, 1951

2,549,795

UNITED STATES PATENT OFFICE 2,549,795

ORGANIC ANTIMONY COMPOUNDS DERIVED FROM 1,3,5-TRIAZINE

Ernst A. H. Friedheim, New York, N. Y.

No Drawing. Application August 24, 1946,
Serial No. 692,927

2 Claims. (Cl. 260—249.6)

This invention relates to therapeutically active organic antimony compounds derived from 1,3,5-triazine, and has particular relation to polymerized salts of p-melaminyl-phenylatibonic acid, to compositions containing such polymerized compounds, and to a process for preparing the same.

It is an object of my present invention to prepare polymerized compounds of the above mentioned type which are soluble in water and show a decreased toxicity and an enhanced trypanocidal activity in comparison with the monomeric compound from which the polymerized compound is formed.

Another object of my invention consists in preparing polymerized compounds of p-melaminyl-phenylstibonic acid, which have a pronounced prophylactic effect in the T. equiperdum infection.

A further object of this invention is to provide stable aqueous solutions of polymerized sodium p-melaminyl-phenylstibonate, said solutions having a relatively low toxicity, high trypanocidal activity and a pronounced prophylactic effect.

Other objects and advantages of the present invention will be apparent from the following specification and the appended claims.

As described in my co-pending application Ser. No. 506,564, filed October 16, 1943, now Patent 2,418,115, April 1, 1947, p-melaminyl-phenylstibonic acid may be prepared by the reaction of cyanuric chloride and sodium stibanilate. For example, a solution of 204 g. of freshly distilled cyanuric chloride in 900 ml. of acetone is run, with mechanical stirring, into 2000 ml. of water, 2000 g. of chipped ice and 10 ml. of 2-ethylhexyl alcohol. To the resulting milky suspension is added slowly, with stirring and external cooling, a solution of 308 g. sodium stibanilate and 69 g. of anhydrous potassium carbonate in 3600 ml. of water. The temperature of the reaction mixture is maintained at $-3°$ to $-5°$ and the pH at 7 by the addition of concentrated aqueous potassium carbonate solution. As soon as the test for primary aromatic amine has become negative in the resulting thick white paste, 5000 ml. of ice-cold 28% aqueous ammonia are added and the reaction mixture is saturated at 25° with gaseous ammonia. The temperature is then slowly, e. g. within 2 to 2½ hours, raised to 95°. 20 g. of activated charcoal are added to the resulting milky suspension. The mixture is cooled to 10° and filtered. The clear, slightly yellowish filtrate is cooled to 0° and saturated with $CO_2$, whereupon p-melaminyl-phenylstibonic acid precipitates.

The precipitate is filtered off, washed free from ammonium salts with ice water saturated with $CO_2$ and dried in vacuo.

The p-melaminylphenylstibonic acid thus obtained is a white amorphous powder, insoluble in cold, and sparingly soluble in hot water. It is insoluble in ethanol, ether and chloroform, and decomposes with charring above 250° C.

In order to prepare sodium p-melaminylphenylstibonate, 100 g. of p-melaminylphenylstibonic acid are dissolved in 4000 ml. of water containing 12 g. of sodium hydroxide. The solution is charcoaled and filtered. 320 g. of sodium hydroxide are added gradually, with stirring and cooling, to the clear filtrate, the temperature not exceeding 35° C. On standing at 5° C., sodium p-melaminylphenylstibonate forms a crystalline precipitate, which is filtered off, washed with 2 N sodium hydroxide, ethanol and ether. When dried at a pressure of 25 mm. of mercury at 25° C. over sulfuric acid, the product has a moisture content corresponding to an octahydrate.

The sodium p-melaminylphenylstibonate forms white needles from hot water. It is sparingly soluble in cold water, insoluble in ethanol and acetone. It is precipitated from aqueous solutions by carbonic, acetic and hydrochloric acid.

Polymerization of this salt takes place in aqueous solution at ordinary and quicker at elevated temperature. I prefer polymerization of the salt in an aqueous solution of urea. For example, 80 g. of crystalline sodium p-melaminylphenylstibonate are dissolved with warming in a solution of 110 g. of urea in 190 ml. of water. The pH of the reaction mixture is adjusted with carbon dioxide to 8.5. The solution is filtered and heated, for example at 56° C., for 45 minutes. 1500 ml. of 95% ethanol are added with stirring. The polymerized sodium p-melaminylphenylstibonate precipitates, is filtered off, washed with ethanol and ether and dried in vacuo.

The polymerized sodium p-melaminylphenylstibonate is an amorphous white powder, readily soluble in cold water, very soluble in aqueous urea solutions, soluble in propylene glycol, and insoluble in ethanol and ether. It is precipitated from its aqueous solutions by carbonic, acetic, and phosphoric acid in the form of a gelatinous paste. The viscosity of its aqueous solutions increases with time, up to the formation of tixotropic gels. For example, a 3% solution in 4% aqueous urea solution, showed, 4 hours after preparation, a relative viscosity of 1.8, the viscosity of the solvent at the same temperature being taken as unity. The relative viscosity of a solution of the crystalline stibonate of equal antimony content was less than 1.05. A 2% aqueous solution of the polymer shows strong flow birefringence when observed between crossed Nicols. An analogous solution of the crystalline sodium salt is optically inactive.

Polymerization is influenced by temperature, heating time and pH and it may be carried out in aqueous solution in the absence of urea. Polymerization proceeds slowly at ordinary room temperature (15°–25° C.) and is increased by raising the temperature, for example to 56°–75° C. The pH may be adjusted by means of $CO_2$, and a pH of 8.5 gives very satisfactory results.

In comparison with the crystalline stibonate, the polymer has a 4-fold increased trypanocidal activity, and a 17-fold decreased toxicity, the dose min. curative 100% gr./kg. being 0.0125 in comparison to 0.05, while the dose max. tol. gr./kg., amounts to 2.5 in comparison to 0.15. Thus, the amorphous polymer has a therapeutic index of 200 in comparison to the therapeutic index 3 of the crystalline sodium salt.

Mice were treated with a single i. p. dose of the polymerized compound and after an interval of 68 days injected with a suspension of virulent *T. equiperdum*. Daily blood examinations were then carried out. Animals found to be negative after 37 days were then reinfected and controlled by daily blood examinations. It was found that all treated animals were protected, while untreated control animals were killed within 3–5 days by the test infection.

Reference is made to my co-pending applications Ser. No. 459,636 filed on Sept. 25, 1942, now Patent 2,415,515, Feb. 17, 1947, and Ser. No. 506,564, filed on Oct. 16, 1943, of which this is a continuation-in-part.

What I claim is:

1. A process for the homo-polymerization of mono-sodium p-melaminyl-phenylstibonate, said process comprising heating an aqueous solution of monomeric mono-sodium p-melaminylphenylstibonate in the presence of urea until a homo-polymerization product soluble in said solution is formed.

2. A process for the homo-polymerization of mono-sodium p-melaminyl-phenylstibonate, said process comprising heating an aqueous solution of monomeric mono-sodium p-melaminylphenylstibonate in the presence of urea at a pH of about 8.5 until a homo-polymerization product soluble in said solution is formed.

ERNST A. H. FRIEDHEIM.

No references cited.